United States Patent
Tanaka et al.

[11] Patent Number: 5,867,541
[45] Date of Patent: Feb. 2, 1999

[54] METHOD AND SYSTEM FOR SYNCHRONIZING DATA HAVING SKEW

[75] Inventors: Akira Tanaka, Isehara; Kenichi Ishibashi, Kokubunji; Takehisa Hayashi, Sagamihara; Akira Yamagiwa, Kanagawa, all of Japan

[73] Assignee: Hitachi, Ltd., Tokyo, Japan

[21] Appl. No.: 441,613

[22] Filed: May 15, 1995

[30] Foreign Application Priority Data

May 18, 1994 [JP] Japan ................................ 6-103619

[51] Int. Cl.$^6$ .................................................. H04L 7/00
[52] U.S. Cl. .......................... 375/354; 375/231; 370/516
[58] Field of Search .................................. 375/354, 356, 375/357, 231, 362, 364–366; 370/100.1, 503, 509, 514, 516; 371/1; 360/26

[56] References Cited

U.S. PATENT DOCUMENTS

| | | | |
|---|---|---|---|
| 4,621,366 | 11/1986 | Cain et al. | 375/231 |
| 4,817,114 | 3/1989 | Boer et al. | 375/231 |
| 4,995,057 | 2/1991 | Chung | 375/231 |
| 5,274,669 | 12/1993 | Klank et al. | 375/231 |

FOREIGN PATENT DOCUMENTS

| | | |
|---|---|---|
| 1-296734 | 11/1989 | Japan . |
| 1-320841 | 12/1989 | Japan . |
| 2-7736 | 1/1990 | Japan . |
| 5-75594 | 3/1993 | Japan . |
| 6-12140 | 1/1994 | Japan . |

OTHER PUBLICATIONS

"156Mb/s Serial Interface CMOS–LSI for ATM Switching System" T. Kozaki, et al.

*Primary Examiner*—Stephen Chin
*Assistant Examiner*—Bryan Webster
*Attorney, Agent, or Firm*—Antonelli, Terry, Stout, & Kraus, LLP

[57] ABSTRACT

Data is transmitted from any one of a plurality of transmitters in synchronism with a first clock. A receiver receives the data in synchronism with the first clock and a second clock having a predetermined phase relationship with the first clock. Control information is previously held in the receiver regarding data reception conditions associated with the plurality of transmitters to control reception conditions of the receiver on the basis of the control information.

10 Claims, 15 Drawing Sheets

METHOD AND SYSTEM FOR SYNCHRONIZING DATA HAVING SKEW

BACKGROUND OF THE INVENTION

1. Field of the Invention

The present invention relates to a signal input/output device for a computer, a communication apparatus, or the like and more particularly, to a data transmission system which adjusts a variation in propagation delay time (data skew) between data bits and a clock skew to realize high speed data transmission in data transfer between synchronous parallel input/output device.

2. Description of the Related Art

In fields relating to data transfer between LSI's of a computer or to high speed data transmission between computers, there has been a widely employed synchronous data transmission system in which input/output devices provided at signal send/receive sides are controlled by clocks having an identical frequency. Accordingly, in order to increase the performance of a computer or computer system, it is important to increase the synchronous data transmission rate.

For the purpose of increasing the data transmission rate of synchronous data transmission to be carried out through a plurality of conductors such as a cable or a bus, it is necessary to perform data transmission with a cycle shorter than the data propagation delay time between the input/output devices. However, even when the data transmission system is a wave pipelined transfer type, it is difficult to sufficiently increase the transmission rate between parallel input/output devices having a data width of a plurality of bits. This is because the presence of variations (skews) in the data and clock propagation delay time causes reduction of the transmission cycle to be limited.

For the purpose of realizing the reduction of the transmission cycle, a technique for adjusting the data and clock skews is required.

A data skew adjustment technique is disclosed in JP-A-5-75594, a paper entitled "ATM 156 Mb/s Serial Interface CMOS-LSI" reported in Proceedings of the 1992 Spring Meeting of the Institute of Electronics, Information and Communication Engineers, B-445, JP-A-1-320841, JP-A-1-296734 and JP-A-2-7736.

Meanwhile, for the purpose of reducing the clock skew, it is generally necessary to wire clock distribution paths from a reference clock generator to respective input/output devices with an accurately equal length through complex calculation or on a simulation basis. JP-A-6-12140 discloses a technique for eliminating the need for such equal-length wiring of the block distribution paths.

A data skew adjustment technique such as the one mentioned above is roughly divided into two methods which follow. That is, in the first method, a multi-phase clock which is synchronized with a reference clock is generated in a receiver and received data is synchronized with use of the clock for latching the received data at the optimum timing. In the second method, a variable delay circuit is provided for every bit of data received in a receiver to control a delay for each bit such that all of the bits can be synchronized, thereby reducing a data skew.

However, the first method is defective in that it is difficult to realize an accurate phase relationship in the multi-phase clock. For example, when it is desired to use a 4-phase clock to synchronize received data having a high transmission frequency of 100 MHz or a transmission cycle of 10 nanoseconds, clocks having phases shifted accurately by 2.5 nanoseconds are required. In the case of fixed delay elements, since the propagation delay times negligibly among manufactured elements, it is difficult to generate such a 4-phase clock. In the case of phase-locked loop (PLL), since the PLL requires generation of a high frequency signal, this causes the operation of an analog controller to be unstable, leading to the fact that the noise influence by a digital signal may become a bottleneck in the system design.

The second method is defective in that the circuit scale is made large. For finely controlling each bit in the data received with respect to delay thereof, this inevitably involves an increase in the number of delay stages in the variable delay circuit and correspondingly also involves an increase in the scale of the control circuit, which makes it difficult to apply this method to a data transmission system so as to have a data width of several bytes.

The first and second methods have a common defect, that is, these methods do not take application to bus type transmission systems into consideration. Any of the techniques disclosed is directed to only 1:1 data transmission between a single receiver and a single transmitter, but in the case of a bus type transmission system, it becomes necessary for a single receiver to be able to execute data transfer with a plurality of transmitters.

Further, in a 1:1 transmitter/receiver system for performing data transmission over more than several meters, its data skew is relatively large and it is impossible in the prior art to perform data transmission with a cycle shorter than the magnitude of the data skew, which also leads to hinderance of realization of a higher transmission rate.

The prior art clock skew adjustment technique has the following defect. The method of reducing a clock skew by realizing clock distribution paths connecting a reference clock generator and respective input/output devices by using equal length wiring is limited by its structural aspect, in addition to the fact that it requires a lot of troublesome labor and time. This is because the propagation delay time of clock distribution paths actually manufactured is susceptible to manufacturing fluctuation and external electromagnetic waves and thus it is impossible to remove the clock skew as the designer expects at the time of its design.

In the technique disclosed in the above JP-A-6-12140, each of the input/output devices has a local clock generator operated in synchronism with the respective input/output devices and the clock phase of the local clock generator is adjusted so that all of the input/output devices are operated in synchronism with clocks having the same phase.

However, even if it became possible to remarkably reduce the clock skew with use of this technique, it is difficult to increase the data transmission rate of a wave pipeline type data transmission system. This is because, even if the clock skew is so small, it is not clear in the wave pipeline type system to determine which phase that data arrived with. For this reason, for the purpose of realizing the wave pipeline type system, there is employed, in many cases, a source synchronization system in which a transmitter sends a clock simultaneously with its transmission data. In a source synchronization type receiver, however, a means becomes necessary for once latching received data in synchronism with the clock of the source (transmitter) and then for again synchronizing it with the clock of the receiver, which disadvantageously results in that a time necessary between the transmission and reception of the data increase by an amount corresponding to the synchronizing means.

SUMMARY OF THE INVENTION

In order to solve the above problems, a data transmission system in accordance with the present invention has an arrangement which follows.

In accordance with an aspect of the present invention, when data is transmitted in synchronism with a first clock from any one of a plurality of transmitters and is received by a receiver in synchronism with a second clock having a predetermined phase relationship with the first clock, control information regarding reception conditions of the data associated with the plurality of transmitters is previously held to control reception conditions of the receiver.

In this case, it is desirable that before the transmitter transmits the data, the respective transmitters previously transmit respective adjustment signals in a predetermined order, the receiver estimates the adjustment signal received by the receiver, sets and holds the control information corresponding to the respective transmitters, and that before receiving the data from any one of the transmitters, the receiver predetermines the reception conditions on the basis of the control information associated with the transmitter. A period of the adjustment signal is set to be longer than a transmission cycle of data transmitted from the transmitter in a normal operational mode.

In accordance with another aspect of the present invention, there is provided a data transmission system which has a plurality of transmitters, one or more receivers and a connection line connected between the transmitters and the receiver, and wherein the transmitter includes transmission circuits for transmitting data in synchronism with a first clock, and the receiver includes reception circuits for receiving the transmitted data in synchronism with a second clock having a predetermined phase relationship with the first clock, a memory circuit for holding therein reception control information of the receiver associated with the respective transmitters, and a control circuit for controlling the reception circuits on the basis of the receiver control information.

A specific example of the transmitter has an adjustment signal generation circuit for generating an adjustment signal, a data transmission circuit for outputting data to be transmitted, and a selector connected to the adjustment signal generation circuit and the data transmission circuit for selecting and outputting the adjustment signal and the data.

A specific example of the receiver has a latch array for adjusting a skew of the transmitted data and a data reception circuit connected to the latch array for receiving the data in synchronism with the second clock, and the control circuit controls the latch array on the basis of the receiver control information. The receiver also has a reception phase judgement circuit for estimating an output of the latch array and for changing contents of the memory circuit on the basis of a judgement result of the reception phase judgement circuit. The reception phase judgement circuit includes a logical "OR" circuit for judging whether or not all bits of the adjustment signal can be synchronized with the second clock.

More specifically, the receiver has a data edge detection circuit for connecting an input and output of the latch array to determine whether or not the latch array can latch, the data edge detection circuit sets the first condition control to enable latching of bits of the adjustment signal, and the reception phase judgement circuit sets the second condition control to synchronize the bits of an all-data width of the adjustment signal with the second clock of the same phase to change contents of the memory circuit on the basis of the first and second condition settings.

The plurality of latches in the latch array include a first latch for inputting the data, a (h−1)-th latch and a h-th latches (h: an integer of 2 or more) connected at its input to an output of the (h−1)-th latch, and the receiver has a data edge detection circuit for judging whether or not the first latch can latch the data, an inverted-clock generation circuit for generating an inverted clock corresponding to a phase inversion of the clock, and a clock selector for inputting one of the clock and the inverted clock to the first latch according to a judgement result of the data edge detection circuit. Preferably, a delay circuit is provided at a preceding stage of the first latch, the data edge detection circuit has two latches for receiving an input and output of the delay circuit, and the two latches are operated with an output clock of the clock selector to perform judgement on the basis of output signals of the two latches.

Alternatively, the receiver includes means for generating a second clock which is different in phase from the clock, means for supplying the clock or the second clock to the first latch, an output selector for selectively outputting outputs of the plurality of latches, and a phase judgement circuit for judging a phase of the latch output of the output selector relative to the clock.

Further, the receiver includes a selector map for holding therein synchronization control information based on an output of the phase judgement circuit in association with the respective transmitters and a control circuit for controlling the output selector on the basis of the control information.

DESCRIPTION OF THE PREFERRED EMBODIMENTS

Figure 1:
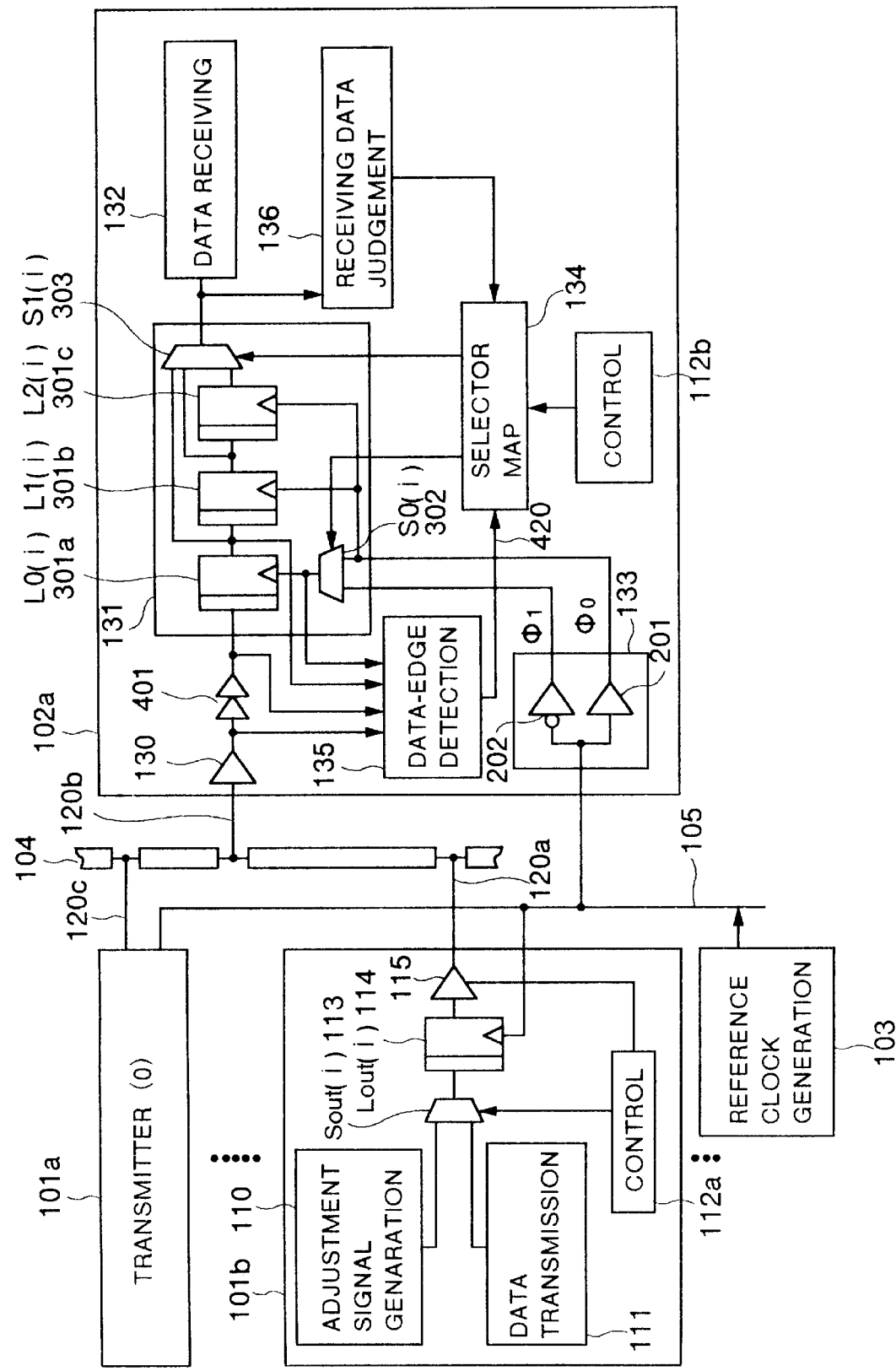
FIG. 1 is a block diagram of a data transmission system in accordance with a first embodiment of the present invention.

FIG. 1 shows a basic arrangement of a data transmission system in accordance with an embodiment of the present invention, which includes transmitters 101. Each of the transmitters 101 has a means for transmitting data in synchronism with a first clock in a normal operation mode and a means for outputting a specific adjusting signal in a skew adjusting operation mode. The illustrated data transmission system also includes a receiver 102. The receiver 102 has a synchronous reception means for receiving data having a phase fluctuation (skew) in synchronism with a second clock having a predetermined phase relationship with the first clock, a means for holding therein information for control of the synchronous reception means in association with the respective transmitters, a means for controlling the synchronous reception means on the basis of the control information, and a means for informing the control means from which transmitter data is to be received.

The second clock may be input from a reference clock generator 103 as in the first clock, or may be the clock transmitted by the transmitters 101 with a predetermined phase difference from transmission data and then received by the receiver. In other words, the second clock may be any clock so long as the first and second clocks have the same frequency.

The receiver 102 has the following structure.

The receiver 102 includes a 2-phase clock generator 133 for outputting a second clock $\phi_0$ and a clock $\phi_1$ different in phase from the second clock $\phi_0$, a latch array 131 for synchronizing input data having a skew with the second clock $\phi_0$ and inputting it to a data receiver circuit 132, a data edge detector 135 for detecting the presence or absence of latching in the latch array 131, a judger 136 for judging whether or not all bits of input data of the data receiver circuit 132 are synchronized in the same phase with the second clock $\phi_0$, a selector map 134 for holding herein results of the data edge detector 135 and judger 136 and for controlling selectors 302 and 303 within the latch array 131 at their optimum settings, and a control circuit 112 for informing the selector map 134 of which one of transmitters 101 transmits the data.

In the illustrated example, the clock $\phi_1$, selector 302 and data edge detector 135 are provided for the purpose of avoiding such a situation in which latching cannot be effected due to the fact that the receiver 102 receives data in an arbitrary phase relationship with respect to the second clock $\phi_0$.

The data transmission system of the present invention has two operational modes, that is, a skew adjusting operation in which the inputting and holding operations of the selector map 134 are carried out, and a normal operation in which the selectors 302 and 303 of the latch array 131 are controlled based on the held contents to carry out high-speed data transmission.

The data edge detector 135 as a means for detecting the latch presence or absence can be implemented, for example, by a general phase comparison circuit or the like. The phase relationship between the clocks $\phi_0$ and $\phi_1$ is set so that the respective data can be latched surely by either one of the clocks.

The receiver 102 is not limited to the illustrated example of using the selector map as a means for holding and reproducing control information, but may be arranged to use a first-in first-out (FIFO) buffer, which will be detailed later in connection with the embodiment of FIG. 15.

All embodiments of the present invention other than the embodiment having the FIFO arrangement are arranged so that a means for previously holding the control information of the skew adjusting means is provided and, prior to the start of data reception in the receiver 102 based on the control information, setting of the skew adjustment control is switched according to one of the transmitters 101 to be transmitted.

The data transfer between the transmitter 101 and receiver 102 is carried out in synchronism with the second clock $\phi_0$ which is in phase with the reference clock.

As already explained above, the data transmission system in accordance with the present invention has two operational modes, that is, the skew adjusting mode and normal operational mode. In the skew adjusting mode, a transmitter 101b transmits a predetermined adjustment signal to determine the optimum setting for skew adjustment and to hold it in the selector map 134. In the normal mode, before the receiver 102 starts its receiving operation of data, the receiver 102 informs the selector map 134 of one of the transmitters 101 which is to transmit data, whereby control of the respective elements of the receiver 102 is switched on the basis of the set information held in the selector map 134. As a result, even data transmission system having a plurality of transmitters such a bus can always perform optimum skew adjustment.

A major part in the skew adjustment is the latch array 131.

In an example in which the latches 301 are connected in series, the latches 301 once latch the received data having a skew over consecutive different phases of the clock $\phi_0$ and hold the data for a time corresponding to several clock cycles as in a shift register. The selector 303 selects one of outputs of the latches 301 in such a manner that all of the bits are synchronized at the timing when the last bit data arrives, and applies the selected output to the data receiver circuit 132. As a result, the skew can be adjusted and high-speed synchronous data transmission can be realized without increasing the transmission delay time between the devices.

FIG. 1 shows the first embodiment of a data transmission system in accordance with the present invention. In the drawing, only two of a plurality of connected transmitters 101a and 101b are illustrated and the other transmitters are omitted. Reference symbol 102a denotes a receiver, numeral 103 a reference clock generator, 104 an n bit width bus, 105 a clock distribution line, 110 an adjustment signal generator, 111 a data transmission circuit, 112a to 112b control circuits, 113 a transmission data selector, 114 a transmission data synchronous latch, 115 an output buffer, 120a to 120c stubs, 130 an input buffer, 131 a latch array, 132 a data receiver circuit, 133 a 2-phase clock generator, 134 a selector map, 135 a data edge detector, 136 a received-data phase judger, 201 a clock buffer, 202 an inverted clock buffer, 301a to 301c received-data synchronous latches, 302 a clock selector, 303 an output selector for the received-data synchronous latches 301a to 301c, 401 a delay element.

In FIG. 1, the single receiver 102a is connected to the n bit width bus 104 through the stub 120b, and similarly the transmitters 101a to 101b are connected to the n bit width bus 104 through the stubs 120c to 120a. The receiver 102a receives data transmitted from any one of the transmitters 101a to 101b. The transmitters 101a to 101b are dynamically switched in the normal mode. The reference clock generator 103 supplies a clock to the transmitters 101a to 101b and receiver 102a through the clock distribution line 105. The control circuits 112a and 112b may be separately provided in the transmitters 101a to 101b and receiver 102a respectively as shown in FIG. 1, or may be externally provided as a single control circuit to control the transmitters 101a to 101b and receiver 102a.

The data transmission system of the present invention, prior to start of the receiver 102a receiving data, is switched to the setting of the skew adjustment corresponding to the transmitter 101b as a data originator. This enables high-speed data transmission between the transmitter 101b and receiver 102a.

It is assumed herein that the bus 104 has a data width of n bits, the number of the transmitters 101a to 101b is m, suffix "i" in parentheses ( ) indicates a constituent element associated with a transmission line of the i-th bit ($0 \leq i \leq n-1$), and similarly suffix "j" in parentheses ( ) indicates the j-th device ($0 \leq j \leq m-1$). It is also assumed that the number of stages of the received-data synchronous latches 301a to 301c for the i-th bit is k and suffix "h" indicates the h-th stage of latch ($0 \leq h \leq k-1$) starting with the stub 120b as a start point. For example, the 0-th transmitter 101a is described as the transmitter (0), the j-th transmitter 101b is described as the transmitter (j), the first stage of the received-data synchronous latch 301a for the i-th bit is described as L0(i), and the any-number-th stage is described as Lh(i).

The stage number k of the latch array 131 is determined by the skew of the data. The larger the skew is than the transmission cycle, the larger the stage number k must be set to. A minimum value of the stage number k is 2. FIG. 1 is an example when k=3 as an example.

In the following, on the assumption that the transmitter (j) 101b acquires a bus access authority and executes its transmitting operation in FIG. 1, explanation will be made of the data transmitting operation by the transmitter.

The data transmission system of FIG. 1 has two operational modes, that is, normal and skew adjusting modes. After the power of the data transmission system is turned ON, the system performs its skew adjusting operation at least once before starting the first data transmission. When the control circuit 112a controls the transmission data selector $S_{out}$ (i) 113, the adjustment signal generator is selected in the skew adjustment mode and the data transmitter is selected in the normal mode. Even in any operation of the control circuit 112a, the output buffer 115 of the transmitter (j) 101b having acquired the bus access authority is put in its transmission enable state. The output buffers 115 of the transmitters not having the bus authority are usually kept in their high output impedance state.

Figure 3:
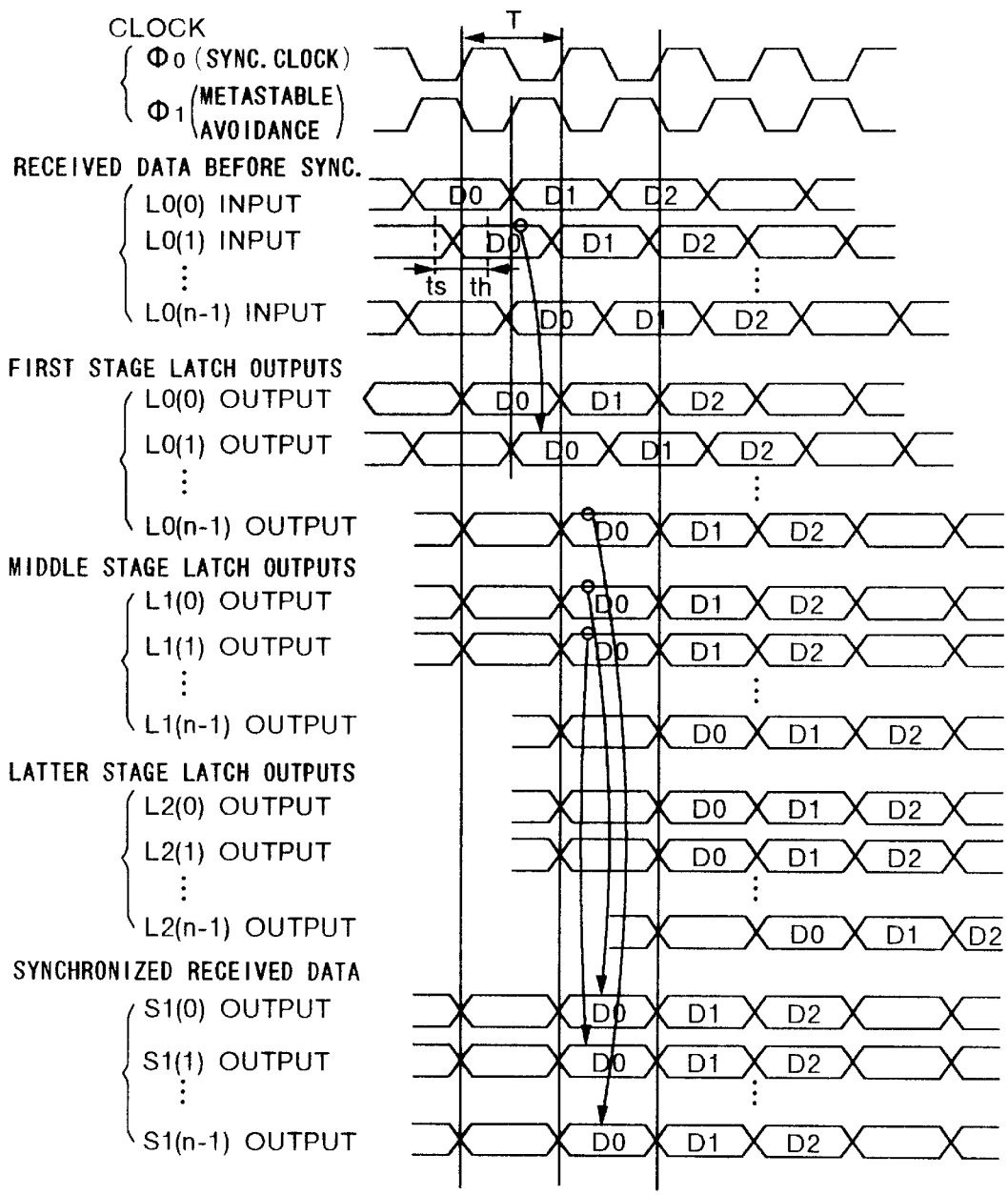
FIG. 3 is a timing chart for explaining the normal operation of the first embodiment of FIG. 1.
Figure 4:
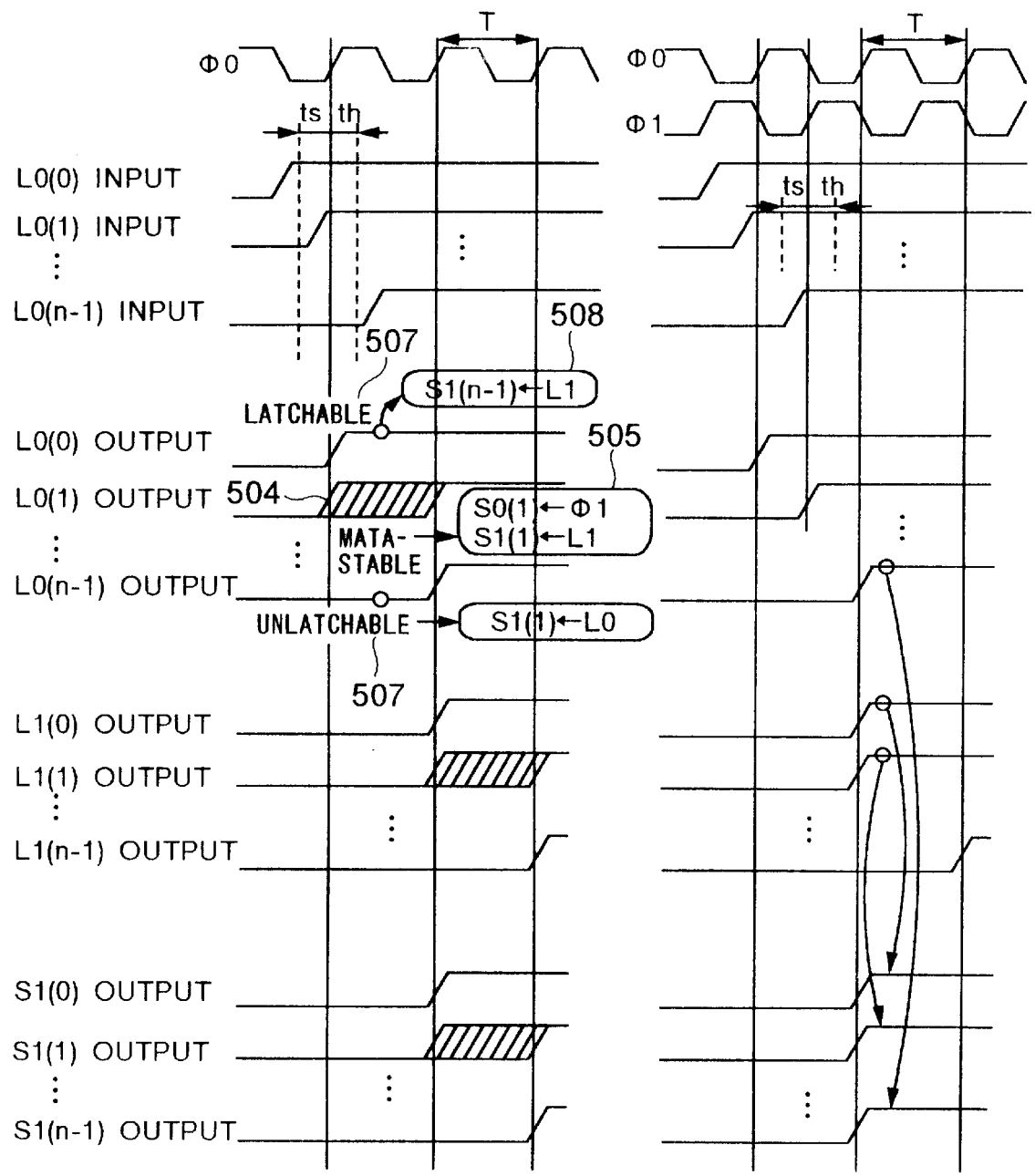
FIG. 4 is a timing chart for explaining the skew adjusting operation of the first embodiment of FIG. 1.

FIG. 3 shows a timing chart for explaining the normal operation of the data transmission system of FIG. 1, and FIG. 4 is a timing chart for explaining the skew adjusting operation. In FIGS. 3 and 4, reference symbol ts denotes a setup time and symbol th denotes a hold time.

FIG. 3 shows the normal mode in which the receiver 102a receives data transmitted from the transmitter (j) 101b having already acquired the bus access authority but with the data skew and clock skew having been adjusted. More specifically, in the transmitter (j) 101b, the transmission data of an n bit width issued from the data transmission circuit 111 is synchronized by the transmission data synchronous latch (i) 114 with the reference clock, and the output buffer 115 outputs the synchronized transmission data onto the bus 104 through the stub 120a. The output data is input to the receiver 102a through the bus 104, stub 120b and input buffer 130. However, when the transmission cycle of the data is short, it is difficult to latch and synchronize the received data immediately as it is. This is because, since the data is passed through the output buffer 115, stub 120a, bus 104, stub 120b and input buffer 130, the data has a data skew and the clock distribution line 105 also has a clock skew.

To avoid this, the received data is subjected to a skew adjustment at the latch array 131 and then applied to the data receiver circuit 132 in synchronism with the clock of the receiver 102a. The 2-phase clock generator 133 outputs the clocks $\phi_0$ and $\phi_1$ from the clock buffer 201 and inverted clock buffer 202 on the basis of the reference clock received from the clock distribution line 105. The clock $\phi_1$ is a local clock for avoiding such a situation that the latch L0 (i) 301a becomes metastable. Since the delay element 401 is provided for improving the performance of the data edge detector 135, explanation will be made later together regarding the data edge detector 135. The selector map 134, which comprises, e.g., a register file, receives and holds therein control information of the clock selector S0(i) 302 and output selector 303 in the skew adjustment mode and, in the normal mode, optimally switches the clock selector S0(i) 302 and output selector S1(i) 303 on the basis of the control information each time the transmitter (j) 101b, having acquired the bus access authority, is changed.

Explanation will be given for the skew adjusting operation in the normal mode with reference to FIGS. 1 and 3.

Shown in FIG. 3 is an example wherein, in an input part of the latch L0(i) 301a, the 0-th bit data arrives first, the (n−1)-th bit data arrives last, the first bit data is between the 0-th and (n−1)-th bit data and arrives at such timing that the setup time ts and hold time th for the latch L0(1) of the clock $\phi_0$ cannot be guaranteed. In this case, with respect to the clock selectors S0(1) 302, the selectors S0(0) and S0(n−1) select the clock $\phi_0$ and the selector S0(1) selects the clock $\phi_1$. Accordingly, with respect to the outputs of the first stage of latches L0(i) 301a, as shown in FIG. 3, the outputs of the latches L0(0) and L0(n−1) are shifted by one cycle relative to the clock $\phi_0$ and the output of the latch L0(1) is issued at the timing of the clock $\phi_1$ located at a phase between cycles of the clock $\phi_0$.

The second stage and subsequent stages of latches Lh(i) ($1 \leq h \leq k-1$) are all operated in synchronism with the clock $\phi_0$ and the latches Lh(i) receive and output the one-cycle-previous outputs of the previous stage of latches Lh−1(i) as in a shift register. Accordingly, with regard to the outputs of the middle stage of latches L1(i) 301b, the outputs of the latches L1(0) and L1(1) have the same clock phase and the output of the latch L1(n−1) lags the outputs of the latches L1(0) and L1(1) by a phase corresponding to one cycle, as shown in FIG. 3. The data outputs of the subsequent stages of latches L2(i) 301c are sequentially sent to the next stage of latches while keeping this inter-bit phase relationship.

With regard to the output selectors S1(i) 303, the selectors S1(0) and S1(1) select the output of the latch L1(0) and the output of the latch L1(1) respectively and the selector S1(n−1) selects the output of the latch L0(n−1). Accordingly, the outputs of the output selectors S1(i) 303 are synchronized with the clock $\phi_0$ having the same phase with respect to all of the bits as shown in FIG. 3. The synchronized outputs are applied to the data receiver circuit 132, at which stage the data receiving operation is completed.

As mentioned above, the latch array 131 synchronizes all of the the bits at the timing when the latch array latches the bit of the data arrived at the receiver 102a and having the last phase. That is, the adjustment of the clock and data skews can be carried out and high speed data transmission based on the shortened data transmission cycle can be realized without the need for increasing the number of clock cycles necessary for the data transmission from the data transmission circuit 111 to the data receiver circuit 132.

One of the features of the data transmission system of FIG. 1 is provision of a means, before the transmitter (j) 101b starts its transmitting operation, for informing the receiver 102a of the start of the transmission of the transmitter (j) 101b. Explanation will be given for the operation involved by the acquisition of the bus access authority by the transmitter (j) 101b in the normal mode.

Table 1 given below shows an example of selector control information held in the selector map. Specifically information is held for each bit, with respect to the transmitters (j) 101b regarding clocks to be selected by the clock selectors S0(i) 302 and regarding latch outputs to be selected by the output selectors S1(i) 303. For example, Table 1 shows only information associated with the example of FIG. 3. In this case, the selector map 134 previously holds therein such information that, with regard to the clock selectors S0(i) 302, the clock selectors S0(0) and S0(n−1) select the clock $\phi_0$ and the clock selector S0(1) selects the clock $\phi_1$; whereas, with regard to the output selectors S1(i), the output selector S1(0) selects the output of the latch L1(0) 301b, the output selector S1(1) selects the output of the latch L1(1) 301b and the output selector S1(n−1) selects the output of the latch L0(n−1).

TABLE 1

|  | Selector | | | | | | |
|---|---|---|---|---|---|---|---|
|  | S0 | | | S1 | | | |
| Transmitter | 0 | 1 | ... | n-1 | 0 | 1 | ... | n-1 |
| . | . | . |  | . | . | . |
| . | . | . |  | . | . | . |
| . | . | . |  | . | . | . |
| j | 0 | 0 |  | 0 | L1 | L1 |  | L0 |
| . | . | . |  | . | . | . |
| . | . | . |  | . | . | . |
| . | . | . |  | . | . | . |

The transmitter (j) 101b required to send data to the receiver 102a performs arbitration between the transmitter and the other transmitter (0) 101a to acquire the bus access authority of the bus 104. The control circuit 112a puts the output buffer 115 in the transmission enable state to start the data transmission. Simultaneously with the decision of the arbitration result, in the receiver 102a, the control circuit 112b informs the selector map 134 that the transmitter (j) 302 acquired the bus access authority, and the selector map 134, on the basis of such control information as shown in Table 1, switches the clock selectors S0(i) 302 and output selectors S1(i) 303 to start the data reception.

Figure 5:
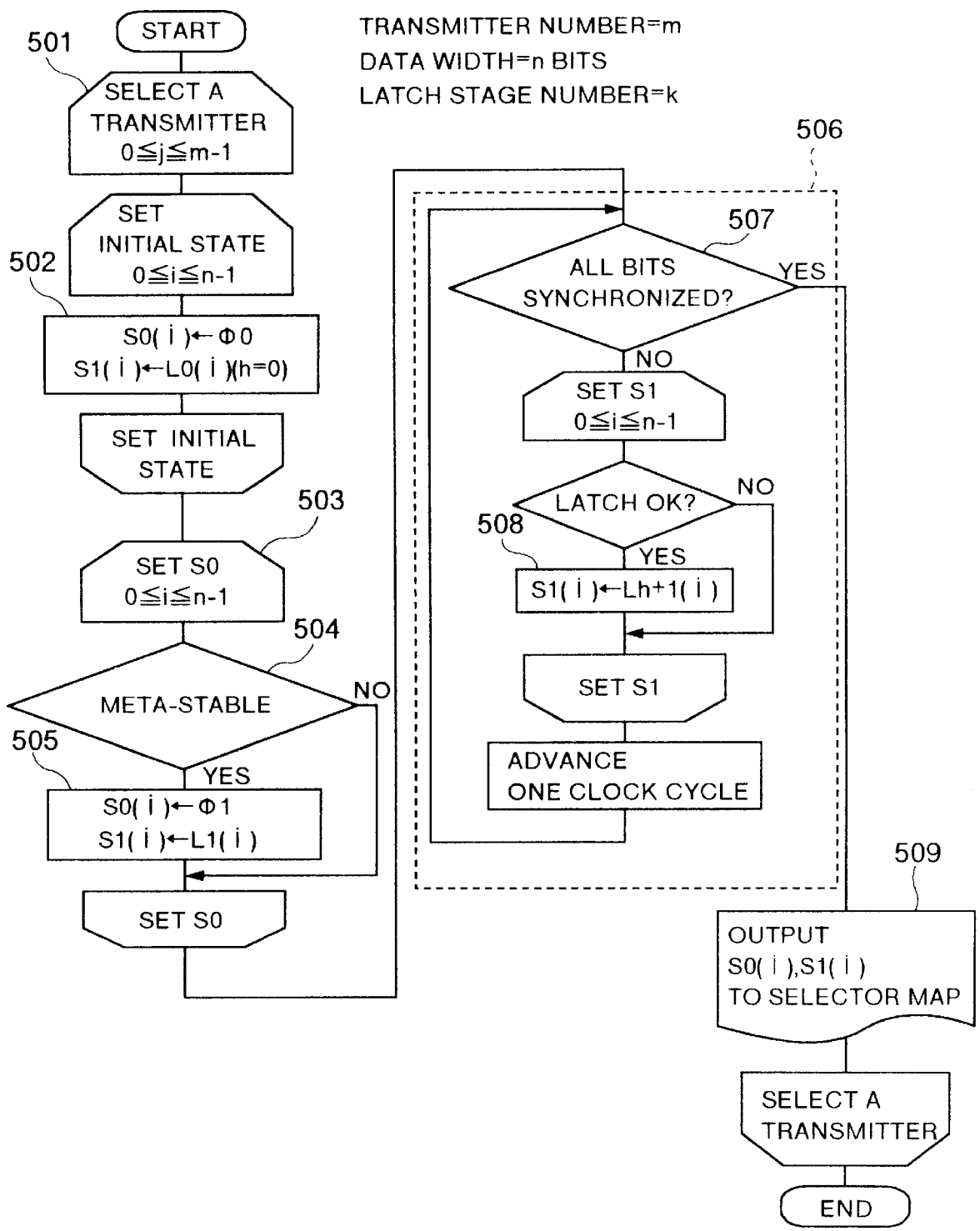
FIG. 5 is a flowchart for explaining the skew adjusting operation of the first embodiment of FIG. 1.

The skew adjusting operation will then be made by referring to FIGS. 1, 4 and 5.

FIG. 4 shows a timing chart for explaining the skew adjusting operation for a data phase relationship as exemplified in FIG. 3, showing the initial state and the state after the selectors S0(i) and S1(i) were selected. FIG. 5 shows a flowchart for explaining the skew adjusting operation when the number of transmitters is set to be m, the data width is set to have n bits and the stage number of received-data synchronous latches 301a is set to be k (k=3 in FIG. 1).

As shown in FIG. 5, the transmitter (j) 101b is first selected in step 501 to start the skew adjusting operation in the data transfer between the selected transmitter (j) 101b and the receiver 102a. In the skew adjustment mode, the transmission data selector 113 selects the output of the adjustment signal generator. The adjustment signal may be, for example, such a step signal that causes all bits to be simultaneously raised as shown in FIG. 4. The selector map 134, when receiving a notification of the start of the skew adjustment from the control circuit 112b, sets the initial state for all the bits in a step 502. In the initial state, the clock selector S0(i) 302 selects the clock $\phi_0$ and the output selector S1(i) 303 selects the output of the latch L0(i) 301a. The operational waveforms of signals in the initial state are shown in FIG. 4. As shown in FIG. 3, in the input part of the latch L0(i) 301a, the 0-th bit arrives first, the (n−1)-th bit arrives last, and the first bit is put between the 0-th and (n−1)-th bits and arrives with such a phase that the setup time ts and hold time th of the latch L0(1) 301a are not guaranteed for the clock $\phi_0$. Accordingly, with the output of the latch L0(i) 301a, the data of the 0-th and (n−1)-th bits are shifted by a phase corresponding to one cycle of the clock $\phi_0$, so that the first bit data is put in an unstable (more exactly, metastable) state in step 504 and thus cannot be synchronized.

Next, as shown in FIG. 5, the selection of the clock selector S0(i) 302 is started in step 503. The data edge detector 135 detects a bit corresponding to the metastable output of the latch L0(i) 301a in step 504; the clock selector S0(i) 302 for the bit selects the clock $\phi_1$ and the output selector S1(i) 303 selects the output of the latch L1(i) 301b in step 505. In FIG. 4, this holds true for the first bit. In this case, since the metastable phase data (first bit) for the clock $\phi_0$ as well as the setup time ts and hold time th for the clock $\phi_1$ are guaranteed, reliable latch can be obtained with the clock $\phi_1$.

Subsequently, as shown in FIG. 5, the selection of the output selector S1(i) 303 is started in step 506. In step 507, first, the received-data phase judger 136 judges whether or not of the bits can be synchronized. When the adjustment signal is such a step signal allowing simultaneous turning ON of all the bits as shown in FIG. 4, the received-data phase judger 136 simply comprises an all-bit data logical "AND" circuit. When there is an unsynchronizable bit due to the shifted phase of the data, as shown in step 508, for the synchronizable bits, the output selectors S1(i) 303 select the outputs of the next stage of latches L1(i) 301b and then control is advanced by one clock cycle to again judge whether or not all of the bits are synchronizable in step 507. When all of the bits have been synchronized, the selection of the output selector S1(i) 303 is completed. At this point, the output of the output selector S1(i) 303 is synchronized with the clock $\phi_0$ in the same phase with respect to all of the bits as shown in FIG. 4.

The selector control information obtained through the above procedure is output to the selector map with such a format as shown in Table 1 in a step 509, and the selector map 134 itself holds the information even after the completion of the skew adjusting operation. When the skew adjusting operation has been completed over all of the transmitters (j) 101b, the program leaves the step 501 and terminates the skew adjusting operation.

Figure 6:
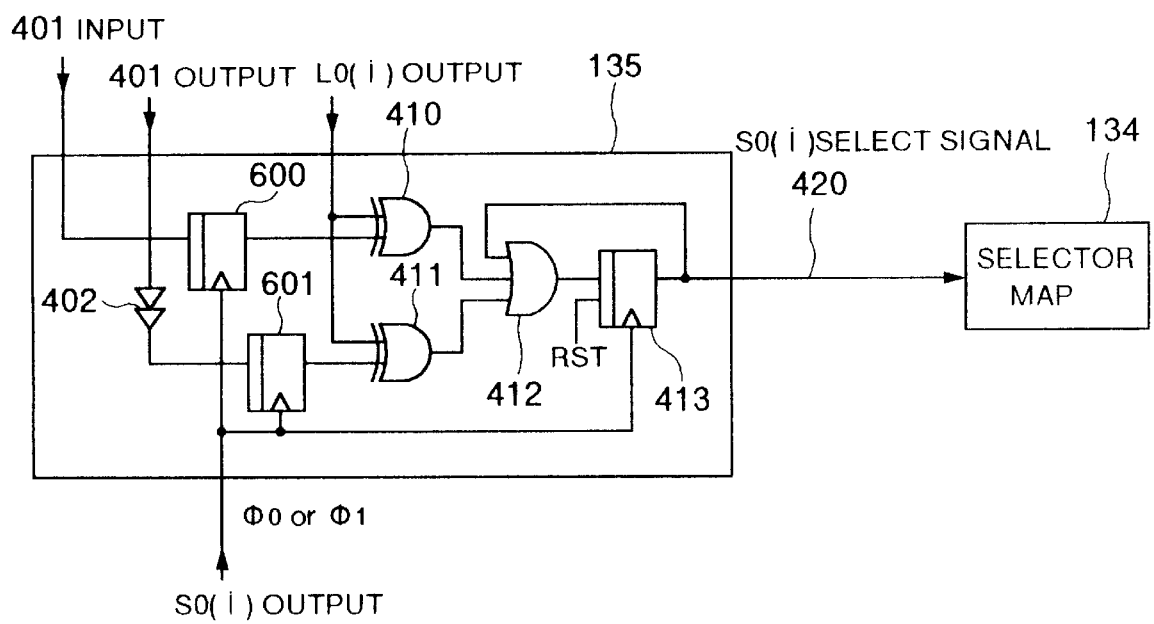
FIG. 6 is a block diagram of a data edge detector in the first embodiment of FIG. 1.

FIG. 6 shows an example of structure of the data edge detector 135 for judging whether or not the first stage of received-data synchronous latches 301a are metastable.

The operation of the data edge detector 135 will be explained with reference to FIGS. 1 and 6. In FIG. 6, reference numerals 410 and 411 denote exclusive logical "OR" circuits, 412 a logical "OR" circuit, 413, 600 and 601 latches, 420 a signal line through which a control signal of the clock selector S0(i) 302 is sent to the selector map and, reference symbol RSR denotes a reset terminal for the latches 413, 600 and 601.

As shown in FIG. 1, inputs to the data edge detector 135 include the input and output of the delay element 401, the output of the received-data synchronous latch L0(i) 301a and the output of the clock selector S0(i) 302. Since the delay element 401 is provided in the received-data line, the data edge detector 135 can compare the output latched by the latch L0(i) 301a with the latched output of the phase data lagged by the propagation delay time of the delay element 401 and the latched output of the phase data led by the propagation delay time of the delay element 402. In FIG. 6, when the output of the latch L0(i) 301a is metastable, the output of at least one of the exclusive logical "OR" circuits 410 and 411 has a logical level of "1".

The logical "OR" circuit 412 and the latch 413 are provided for the purpose of increasing the detection sensitivity. Even when the time during which the exclusive logical "OR" circuits 410 and 411 output "1" is as short as merely one clock cycle, the logical "OR" circuit 412 and latch 413 hold the output "1" until a reset signal is input to the terminal RST. This output is applied as a control signal of the clock selector S0(i) 302 to the selector map 134 via the signal line 420. When reliably receiving the output signal and switching the clock selector S0(i) 302, the selector map 134 sends a reset signal to the terminal RST.

Figure 8:
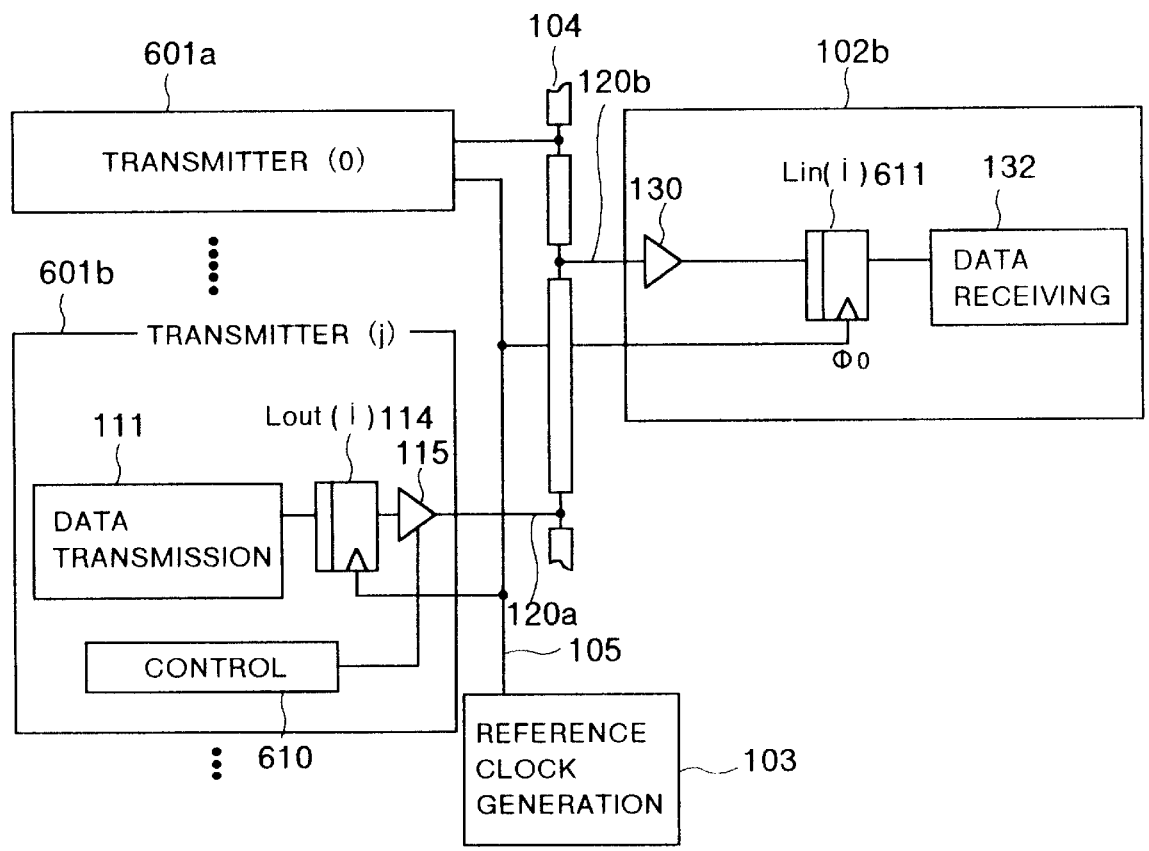
FIG. 8 is a block diagram of a prior art data transmission system.

FIG. 8 shows a prior art data transmission system of a general bus type, in particular, signal input/output devices, in a simplified manner, for comparison of the data transmission system of the present invention. Reference symbol 102b denotes a receiver, 601a and 601b transmitters, 610 a control circuit, 611 a received-data synchronous latch 611. When the transmitter (j) 601b acquires a bus access authority, the control circuit 610 puts the output buffer 115 in its output enable state. The output buffer 115 of the other transmitter (0) 601a is usually put in its high output impedance state. The transmitter (j) 601b and receiver 102b are operated in synchronism with the clock $\phi_0$ supplied from the reference clock generator 103. That is, the transmission data of the data transmission circuit 111 and the reception data of the data receiver circuit 132 are both synchronized with the clock $\phi_0$.

Figure 9:
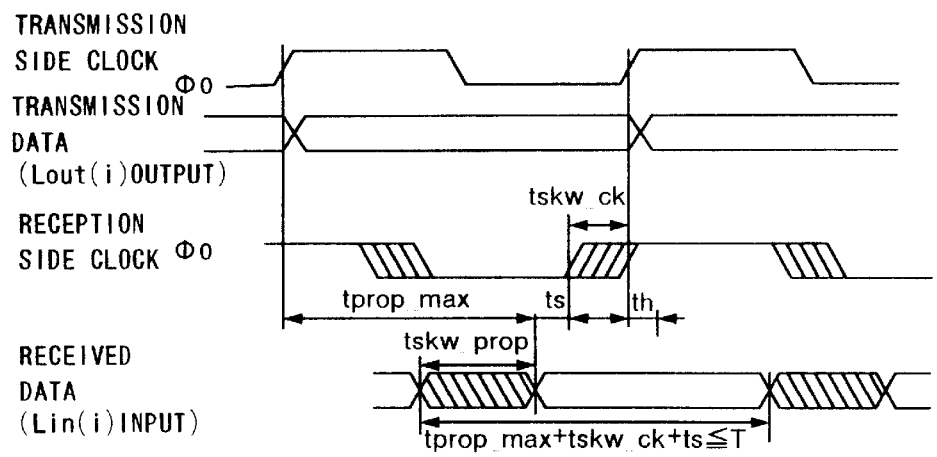
FIG. 9 is a timing chart for explaining data transmission cycles in the prior art of FIG. 8.

FIG. 9 is a diagram for explaining a data transmission cycle in the prior art of FIG. 8. In FIG. 9, symbol tskw__prop denotes data skew, tskw__ck denotes clock skew, tprop__max denotes the maximum value of the data propagation delay time, ts denotes setup time, th denotes hold time, and T denotes data transmission cycle. In the illustrated example, the maximum tprop__max of the data propagation delay time means the maximum propagation delay time relating to all combinations of all of the bits in data transfer between the transmitter (j) 601b and receiver 102b. Accordingly, the data skew tskw__prop is always smaller than the maximum value tprop__max of the data propagation delay time.

As seen from FIG. 9, the transmission cycle T in the prior art arrangement is expressed by the following relationship (1).

$$T \geq t_{prop\_max} + t_{skw\_ck} + t_s \tag{1}$$

That is, the bus type data transmission system of the prior art arrangement is defective in that it is impossible to carry out data transmission with a cycle shorter than the propagation delay time tprop__max between the signal input/output devices.

Figure 10:
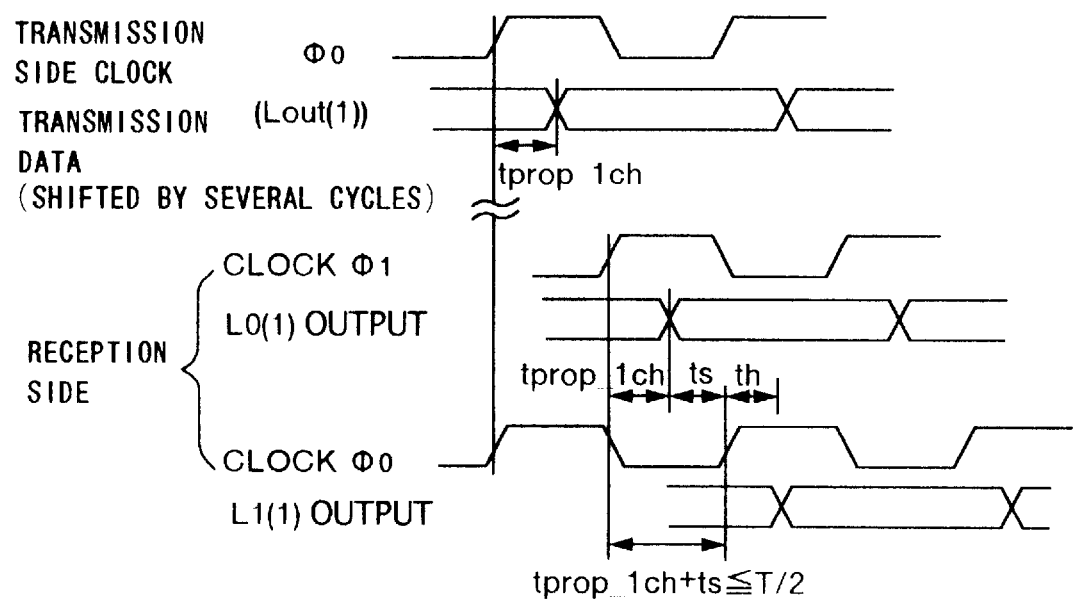
FIG. 10 is a timing chart for explaining data transmission cycles in the first embodiment of FIG. 1.

FIG. 10 shows a diagram for explaining a data transmission cycle of the data transmission system of FIG. 1. In the drawing, symbol tprop__1ch denotes latch propagation delay time. The data transmission system of FIG. 1, unlike the prior art data transmission system of FIG. 8, is advantageous in that the shortening of the data transmission cycle is not restricted by the data skew tskw__prop, the clock skew tskw__ck or the maximum value tprop__max of the data propagation delay time between the devices. As shown in FIG. 10, the transmission cycle is limited by the latch propagation delay time tprop__1ch, setup time ts and hold time th, so that, when the first stage of received-data synchronous latches 301a are operated with the clock $\phi_1$, the transmission rate can be increased to such a transmission cycle that the next stage of latches L1(i) 301b to be operated with the clock $\phi_0$ can be prevented from being metastable. However, when consderation is given to the fact that the hold time th is generally smaller than the propagation delay time tprop__1ch, the transmission cycle T is not affected by the hold time th in the embodiment 1 of FIG. 1.

It will be appreciated from FIG. 10 that the transmission cycle T in the data transmission system of FIG. 1 is expressed by the following relationship (2).

$$T \geq 2 \cdot (t_{prop\_1ch} + t_s) \tag{2}$$

That is, the data transmission system of FIG. 1 can realize a remarkably high data transmission rate when compared with that of the bus type data transmission system of the prior art arrangement.

Figure 7:
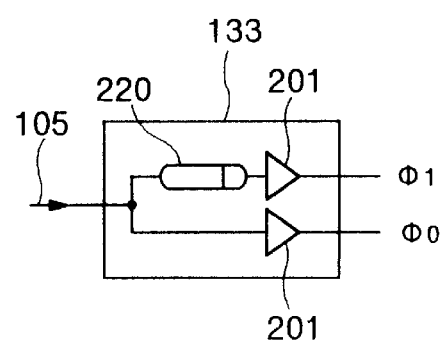
FIG. 7 is a circuit diagram of another example of a 2-phase clock generator which is different in structure from that in the first embodiment of FIG. 1.

FIG. 7 is another example of the 2-phase clock generator 133 in which reference symbol tdly denotes the propagation delay time of a delay element 220 for delaying the clock received from the clock distribution line 105. The clock buffers 201 are used to generate the synchronizing clock $\phi_0$ for the receiver 102 and the local clock $\phi_1$ for avoiding the metastable state. In the illustrated example, the delay time tdly satisfies the inequality (3):

$$T_s + t_h \leq t_{dly} \leq T - t_{prop\_1ch} - t_s \tag{3}$$

Hence, when the 2-phase clock generator 133 of FIG. 7 is used in the data transmission system of FIG. 1, the transmission cycle T is affected also by the hold time th and is expressed by the following relationship (4):

$$T \geq t_{dly} + t_{prop\_1ch} + t_s \tag{4}$$

That is, when tdly=ts+th, the transmission cycle can be decreased by (tprop__1ch)-th when compared with that in the relationship (2).

Although explanation about the data transmission system of FIG. 1 has been given in connection with the case where the transmitters 101b and receiver 102a are interconnected by means of the bus 104, the bus 104 may also be replaced by a switch.

Figure 2:
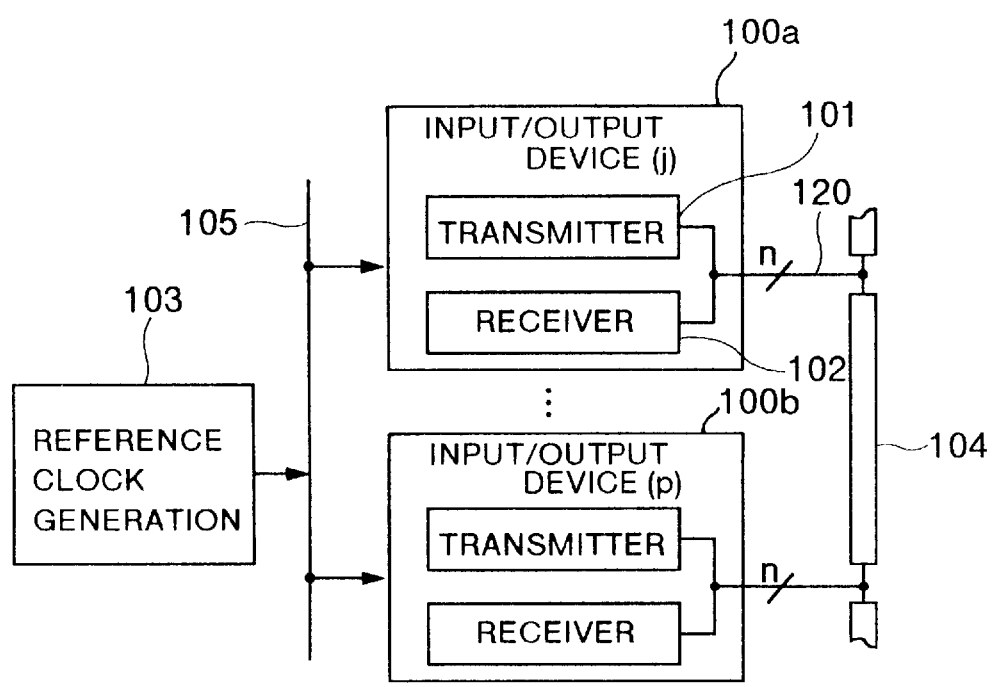
FIG. 2 is a block diagram of a data transmission system in accordance with a second embodiment of the present invention.

FIG. 2 shows a second embodiment of the data transmission system according to the present invention, which includes input/output devices (j) 100a to (p) 100b, transmitters 101 having the same structure as the transmitters 101a to 101b, receivers 102 having the same structure as the receiver 102a, and stubs 120. The number of such input/output devices 100a to 100b is m and such input/output devices are connected to the bus 104 through the respective stubs 120. Any one (j) 100a of the input/output devices performs data transmission with another one (p) 100b of the input/output devices.

Where, j≠p, 0≦i≦m−1, and 0≦p≦m−1.

Figure 11:
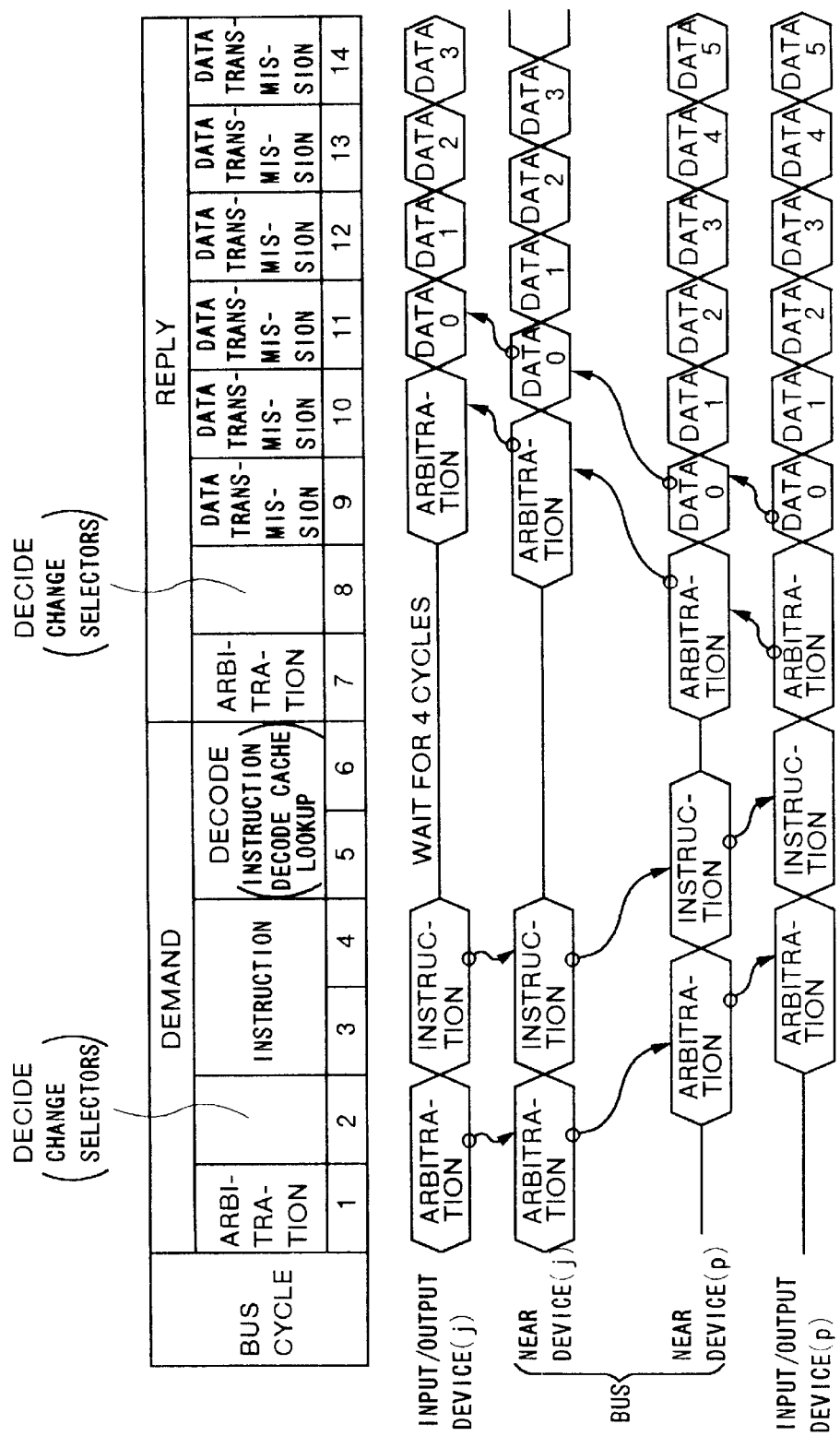
FIG. 11 is a timing chart for explaining the data transmission procedure of the second embodiment of FIG. 2.

FIG. 11 is a diagram for explaining the operational procedure of the data transmission system of FIG. 2. As in the data transmission system of FIG. 1, the data transmission system of FIG. 2, prior to start of data transmission, informs a data demand originator of one of the input/output devices which is a data transmission originator.

This can be realized, for example, according to the following procedure. That is, explanation will be made by referring to FIG. 11 as to the operation, as an example, when the input/output device (j) 100a demands transmission of update data, the input/output device (p) 100b responds to the demand and transmits the update data to the input/output device (j) 100a in FIG. 2. It is assumed in FIG. 11 that the data transmission between the input/output devices (j) 100a and (p) 100b has the largest propagation delay time or skew, requiring 2 clock cycles from the data transmission circuit 111 to the data receiver circuit 132.

The input/output device (j) 100a performs arbitration (state 1) to find a bus access authority through the internal transmitter 101. The arbitration data includes information for discriminating between the instruction transmission and data transmission demanded by the respective input/output devices, through which information the input/output device can know the priority of acquiring the bus access authority. Subsequently, the input/output device (j) 100a demanding the instruction transmission decides to acquire the bus access authority (state 2). In the state 2, the selector of the receiver 102 is switched on the basis of the information of the selector map 134 to get ready for start of data transmission from the transmitter 101 of the input/output device (j) 100a. In states 3 and 4, the input/output device (j) 100a transmits an instruction and the respective input/output devices receive the instruction. The respective input/output devices decode the instruction (states 5 and 6) to perform such processing as cache lookup, as a result of which the input/output device (p) 100b responds to the demand and decides to transmit the update data to the input/output device (j) 100a.

Then the input/output device (p) 100b performs arbitration (state 7) to find the bus access authority through the internal transmitter 101. Since the input/output device (p) 100b demanding the transmission of the update data has the highest priority, the input/output device decides to acquire the bus access authority (state 6). The input/output device (j) 100a is previously set to wait for data only for 4 clock cycles from the state 5 to the state 8. Since it is known from the priority level of the bus access authority that the update data is almost surely transmitted to the input/output device (j) 100a in a state 9, the input/output device (j) 100a can perform address setting operation prior to arrival at the state 9. The decision of the bus access authority (state 8) causes the selector of the receiver 102 to be switched. In the state 9 and subsequent states, the update data is transmitted and received by the input/output device (j) 100a as the demand originator, at which stage the transmitting operation is completed.

In this way, the data transmission system of FIG. 2 can realize a data transmission rate that is higher than the prior art bus type data transmission system as explained in the embodiment 1 according to the operational procedure similar to the prior art.

Figure 12:
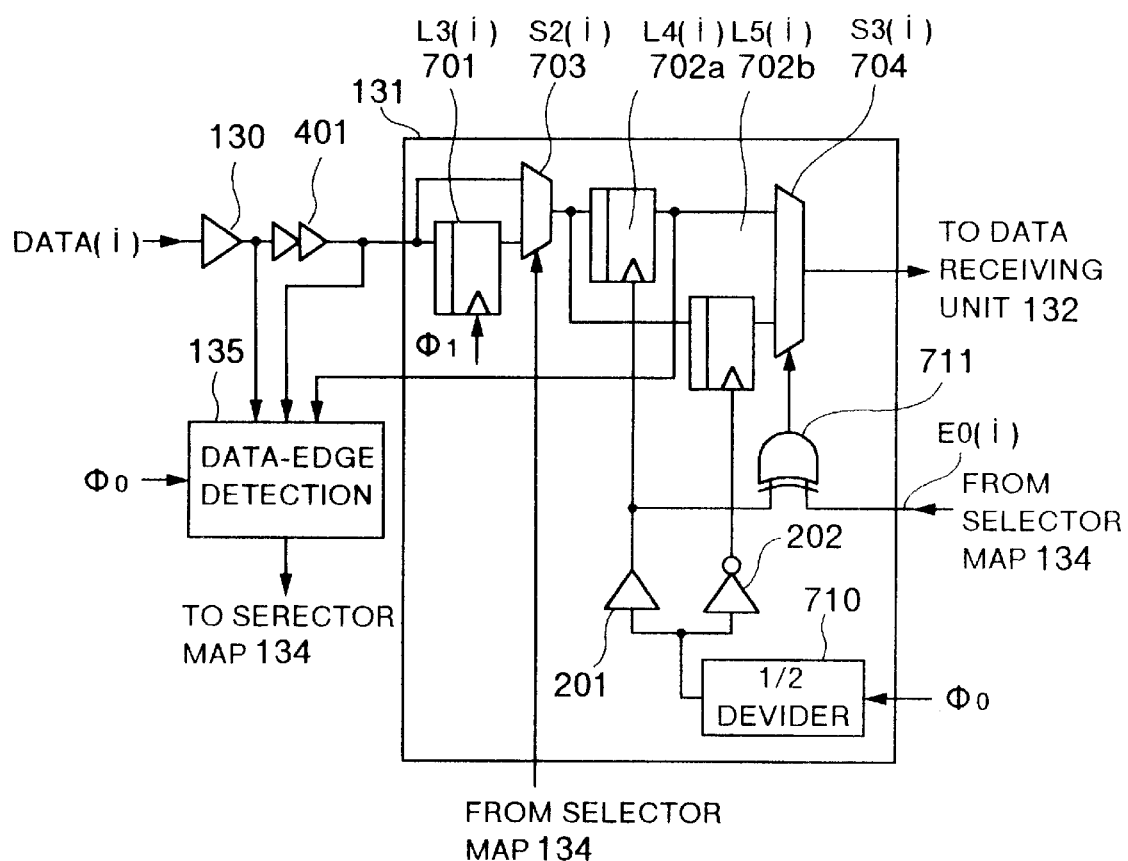
FIG. 12 is a block diagram of a data transmission system in accordance with a third embodiment of the present invention.

FIG. 12 shows a latch array 131 in a data transmission system in accordance with a third embodiment of the present invention. Other parts are substantially the same as those in FIG. 1. In FIG. 12, reference numeral 701 denotes a metastable-state avoidance latch, 702a and 702b denotes received-data synchronous latches, 703 denotes an input selector, 704 denotes an output selector, 710 denotes a clock divider, 711 denotes an exclusive logical "OR" circuit and, E0(i) indicates a control signal E0(i) for the exclusive logical "OR" circuit 711.

The clock $\phi_0$ is increased 100% with respect to cycle through the clock divider 710 so that the received-data synchronous latch L4(i) 702a is operated with a clock $\phi_{0/2}$ through the clock buffer 201 while the received-data synchronous latch L5(i) 702b is operated with an inversion of the clock $\phi_{0/2}$ obtained through an inversion clock buffer. Received data (i) having a skew is alternately latched by the received-data synchronous latches L4(i) 702a and L5(i) 702b for each cycle of the clock $\phi_0$. The output selector S3(i) alternately selects these latch outputs in synchronism with the clock $\phi_0$. In this case, the exclusive logical "OR" circuit 711 puts the output selector S3(i) in its initial state based on the output of the selector map 134. This results in that all the bit data (i) are synchronized with the clock $\phi_0$ in same phase.

For a bit by which both the latch L4(i) 702a and the latch L5(i) 702b become metastable, the input selector S2(i) 701 selects the output of the latch L3(i) 701 operated in synchronism with the clock $\phi_1$, whereby the latches L4(i) 702a and L5(i) 702b avoid the metastable state.

The information held in the selector map 134 has a format such as that shown in Table 1 as in the embodiment 1 of FIG. 1 and corresponds to control information E0(i) on the input selector S2(i) 703 and exclusive logical "OR" circuit 711 associated with the respective transmitters (j) 101b.

Figure 13:
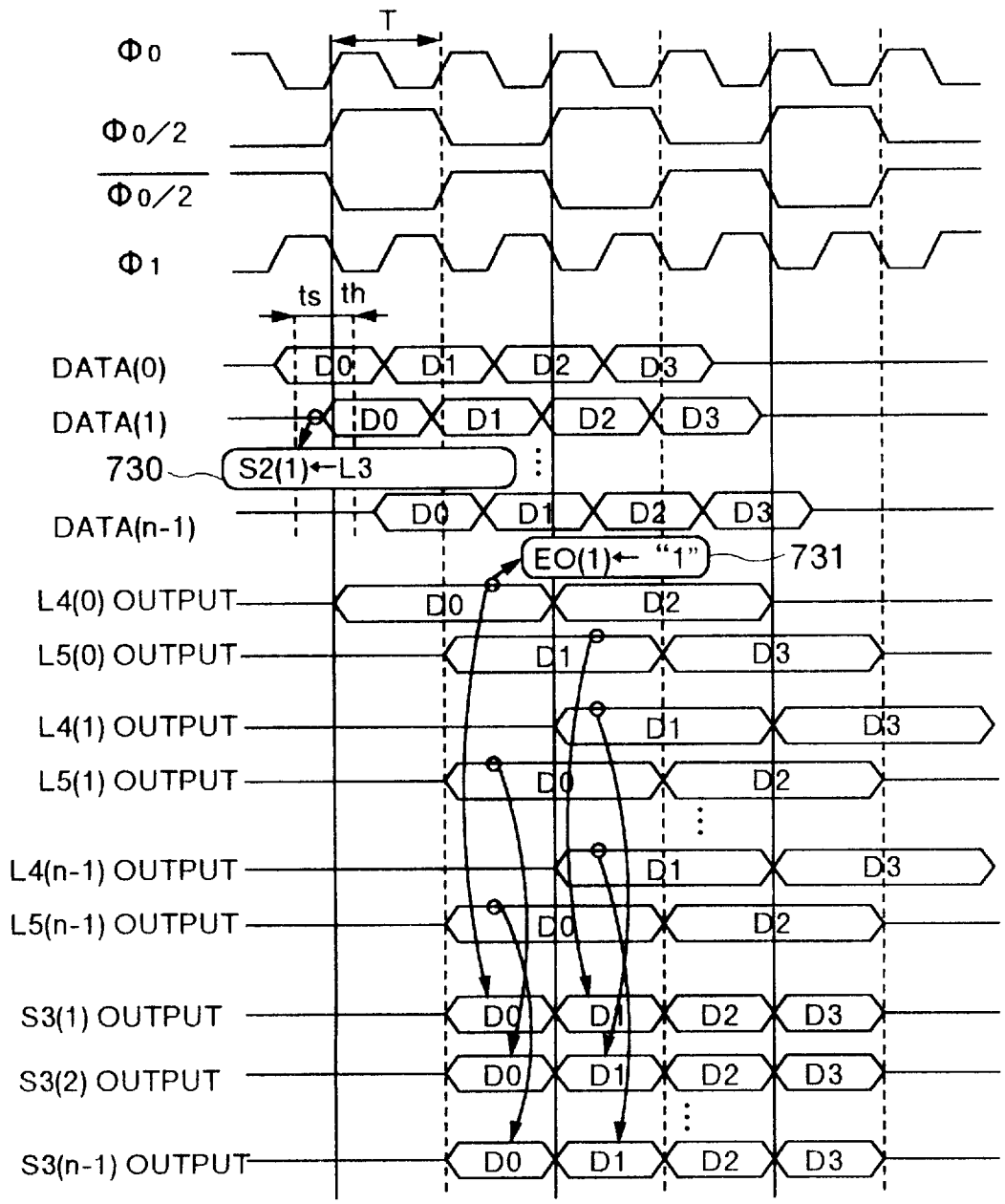
FIG. 13 is a timing chart for explaining the normal operation of the third embodiment of FIG. 11.

FIG. 13 is a timing chart for explaining the normal operational mode of the data transmission system of FIG. 12. The phase of received data is the same as that in FIG. 3. Specifically, the input selector S2(1) 701 selects the output of the latch L3(1) 701 (see a block 730 in FIG. 13), whereby the exclusive logical "OR" circuit 711 inputs a control signal E0(i) of "1" and control signals E0(1) and E0(n−1) of "0" (see block 731 in FIG. 13).

The data transmission system of FIG. 12 can advantageously comprise latches L4(i) 702a and L5(i) 702b. The transmission cycle T is expressed by the above equation (2) that is the same as that in FIG. 1. Further, the embodiment of FIG. 12 may also be applied to the data transmission system of FIG. 2. Furthermore, a switch in place of the bus 104 may be connected between the devices.

Figure 14:
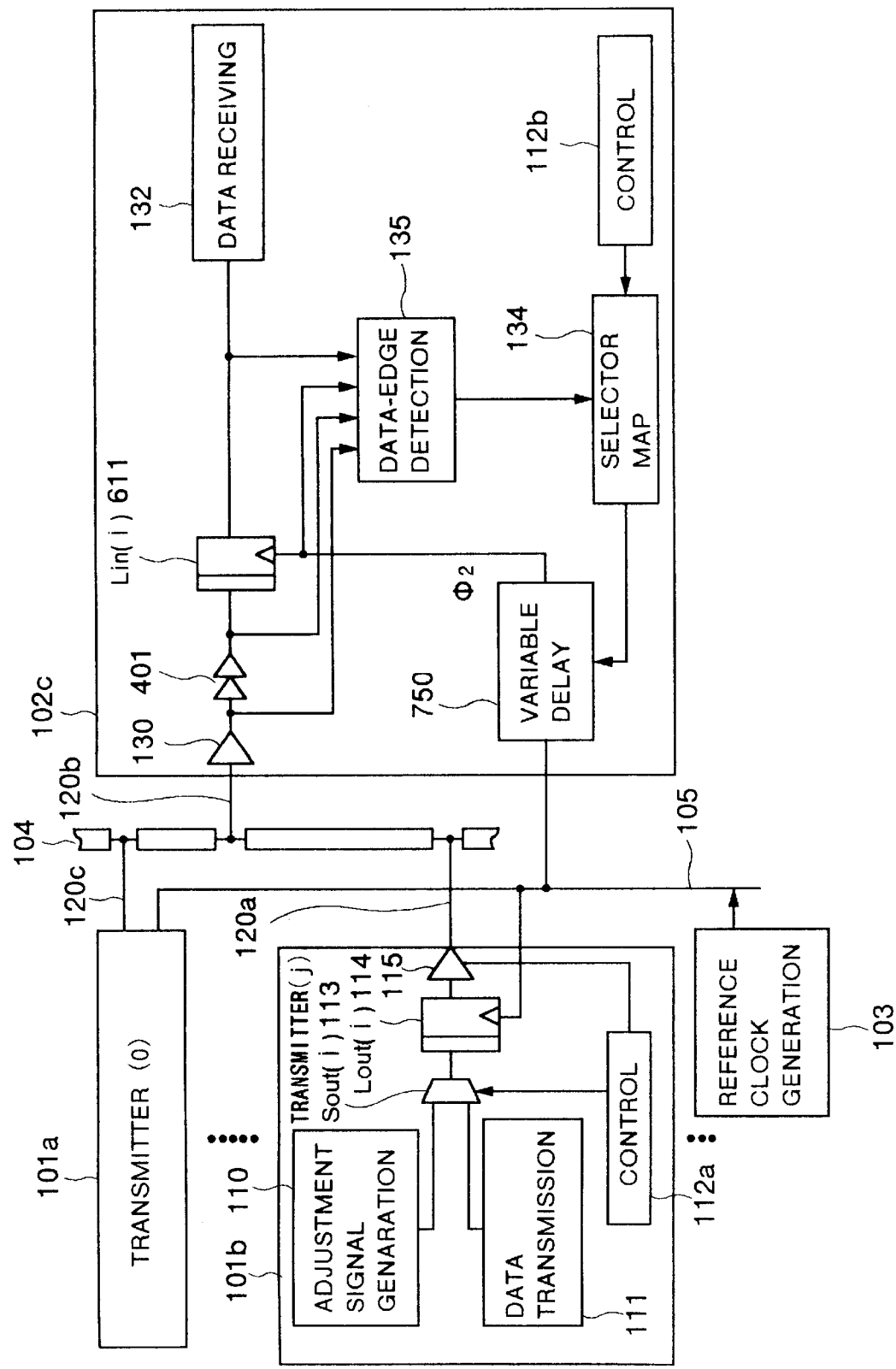
FIG. 14 is a block diagram of a data transmission system in accordance with a fourth embodiment of the present invention.

FIG. 14 shows a data transmission system in accordance with a fourth embodiment of the present invention, which has an advantage in that this fourth embodiment can be implemented and have a small scaled circuit when the data skew tskw_prop is smaller than the transmission cycle T. Reference symbol 102c denotes a receiver 102c and numeral 750 denotes a variable delay circuit. The control information held in the selector map 134 corresponds to delays of the variable delay circuits 750 associated with the respective transmitters (j) 101b. On the basis of the control information of the selector map 134, the variable delay circuit 750 generates a clock $\phi_2$ having such a phase that can synchronize all of the bit data.

Figure 16:
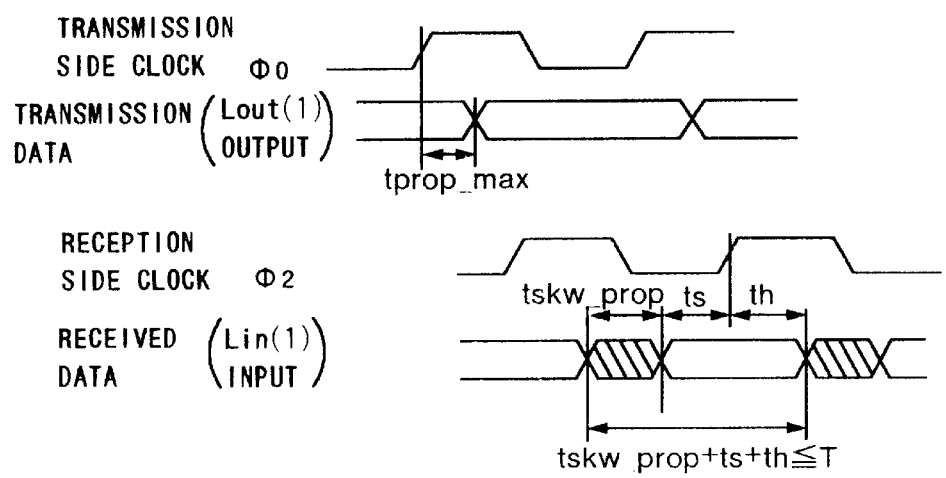
FIG. 16 is a timing chart for explaining the normal operation of the fourth embodiment of FIG. 14.

FIG. 16 is a timing chart for explaining the transmission cycle of the data transmission system of FIG. 14. It will be seen from FIG. 16 that the transmission cycle T of the data transmission system of FIG. 14 is expressed by the following equation (5). The transmission cycle T is not affected by the propagation delay time tprop_1ch of the transmission data synchronous latch Lout(i) 114 and received-data synchronous latch 611.

$$T \geq t_{skw\_prop} - t_s + t_h \tag{5}$$

The embodiment of FIG. 14 may also be applied to the data transmission system of FIG. 2. And the bus 104 may be replaced by a switch connected between the devices.

Figure 15:
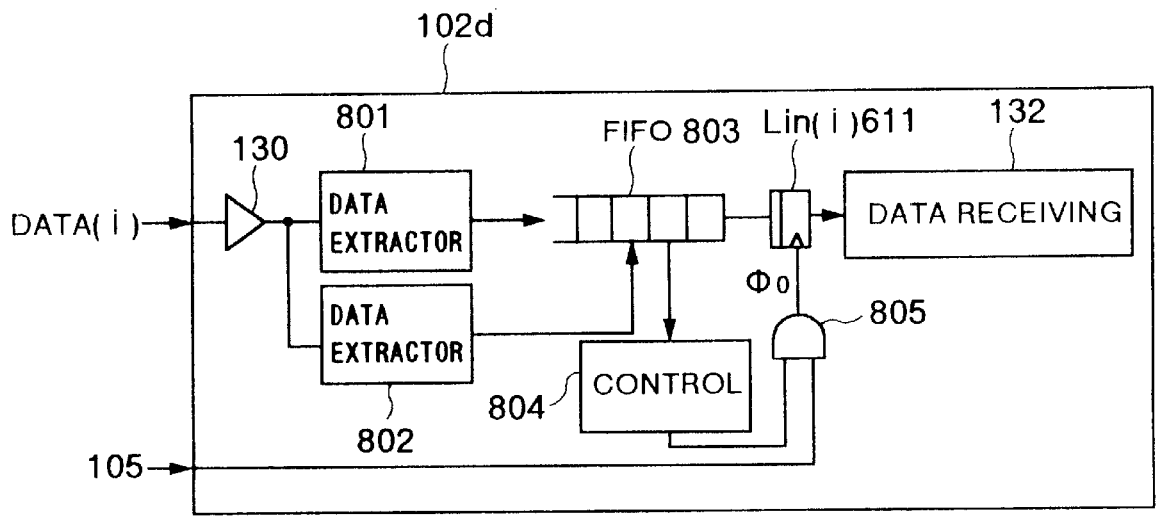
FIG. 15 is a block diagram of a data transmission system in accordance with a fifth embodiment of the present invention.

FIG. 15 shows a receiver 102d in a data transmission system in accordance with a fifth embodiment of the present invention, which includes the receiver 102d, a data extractor 801, a clock extractor 802, a first-in first-out (FIFO) buffer 803, a control circuit 804, and a logical "OR" circuit 805. Transmitters may be the prior art transmitters 601a to 601b shown in FIG. 8. However, it is necessary for the data transmission circuit 111 to transmit data including the clock $\phi_0$.

In the data transmission system of FIG. 15, received data (i) is divided by the data extractor 801 and clock extractor 802 into data and a clock. The data (i) is input while the input side of the FIFO buffer 803 is synchronized with the extracted clock. In the initial state, the control circuit 804 outputs a signal "0" to the logical "OR" circuit 805. The control circuit 804, when the FIFO buffer 803 receives data having an all-data width, applies an output "1" to the logical "OR" circuit 805. When receiving the output "1" from the control circuit 804, the logical "OR" circuit 805 applies to the received-data synchronous latch Lin(i) 611 the clock $\phi_0$ received from the clock distribution line 105, whereby the received-data synchronous latch 611 starts its synchronizing operation. Through the above operation, the data transmission system of FIG. 15 synchronizes the received data with the clock $\phi_0$.

The embodiment 5 of FIG. 15 is advantageous in that the selector map 134 can be unnecessary and thus can be omitted. Further, the embodiment of FIG. 15 can also be applied to the data transmission system of FIG. 2. Furthermore, the bus 104 may be replaced by a switch connected between devices.

Figure 17:
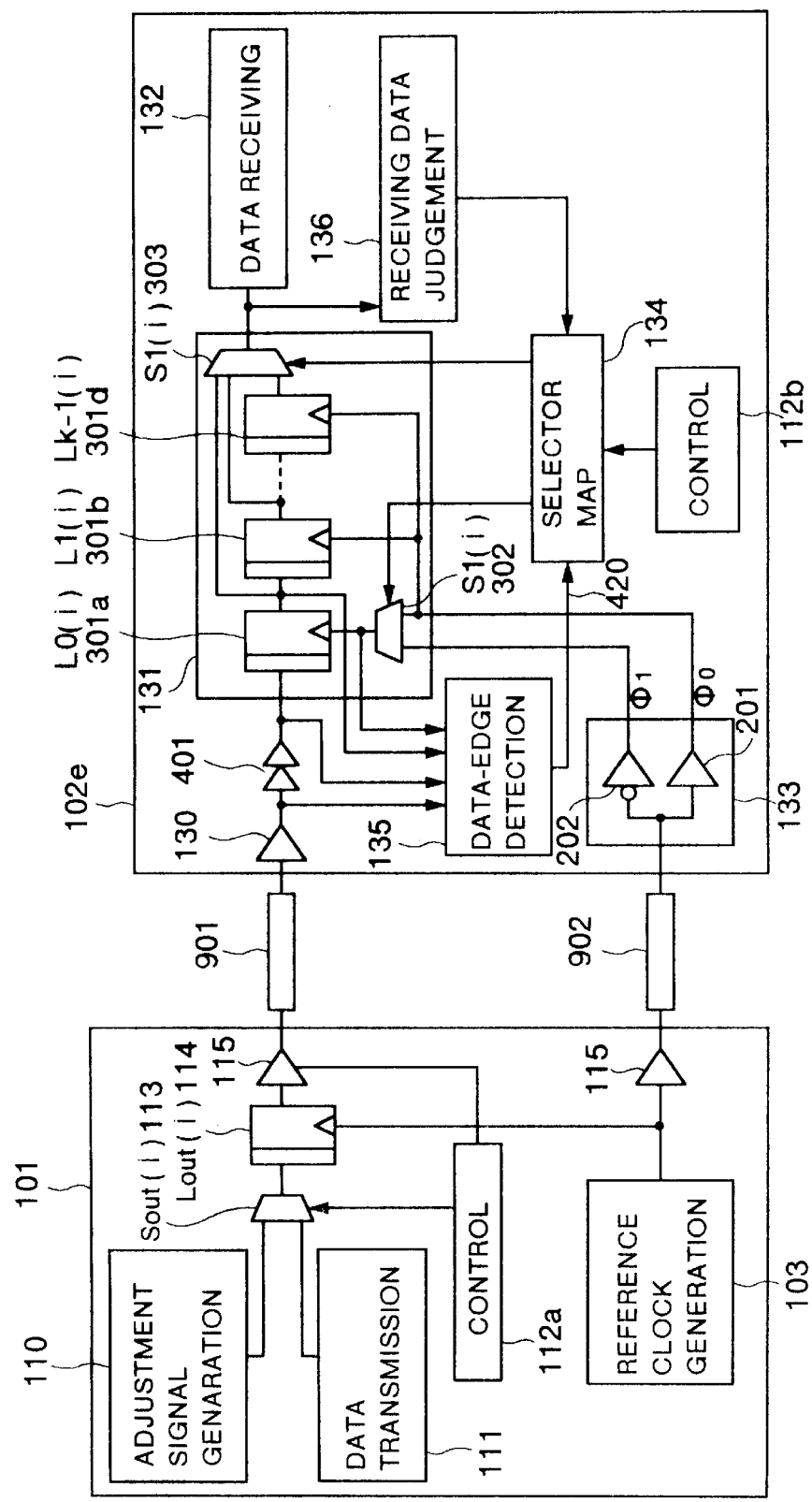
FIG. 17 is a block diagram of a data transmission system in accordance with a sixth embodiment of the present invention.

FIG. 17 is a data transmission system in accordance with a sixth embodiment of the present invention which includes a receiver 102e, a data transmission line 902, and a clock transmission line 902. The data transmission line 901 is connected in parallel to the clock transmission line 902 so that the receiver 102e is operated in synchronism with a clock received from the transmitters 101 through the clock transmission line 902. This is known as a source synchronization system.

The stage number k of the received-data synchronous latches L0(i) 301a to Lk–1(i) 301d in FIG. 17 is larger than that in FIG. 1. This is because the data skew tskw_prop is large compared with the transmission cycle T. Another arrangement including the skew adjusting structure is the same as that in the embodiment of FIG. 1.

When the data skew is denoted by tskw_prop, a setup time is by ts, a hold time is denoted by th and data transmission cycle is denoted by T; the stage number k of the received-data synchronous latches 301a to 301d necessary for the skew adjustment is expressed by a relationship (6) which follows.

$$k \geq \frac{t_{skw\_prop} + t_s + t_h}{T} + 1 \qquad (6)$$

That is, the data transmission systems shown in FIGS. 1, 2 and 17 are advantageous in that, when the latch stage number k is made large, data transmission can be realized with a cycle shorter than the data skew tskw_prop.

In a source synchronization type data transmission system designed for parallel high-speed data transmission with the data and clock transmission lines 901 and 902 each having a short or medium length of approximately several meters, conventionally known skew adjusting methods include a method for providing a variable delay circuit for each bit to reduce a skew, as disclosed in a paper entitled "ATM 156 Mb/s Serial Interface CMOS-LSI" reported in Proceedings of the 1992 Spring Meeting of The Institute of Electronics, Information and Communicate Engineers of Japan, B-445. However, this method, as already explained earlier, is defective in that, because the variable delay circuits and their control circuit have to be made large in scale, it is difficult to increase the number of bits of a data width. The skew adjustment method in accordance with the present invention has an advantage that, since the provision of the latch array 131 eliminates the need for such variable delay circuits, the circuit scale can be made relatively small and the number of bits of a data width can be easily increased, which is preferable for high speed transmission.

Figure 18:
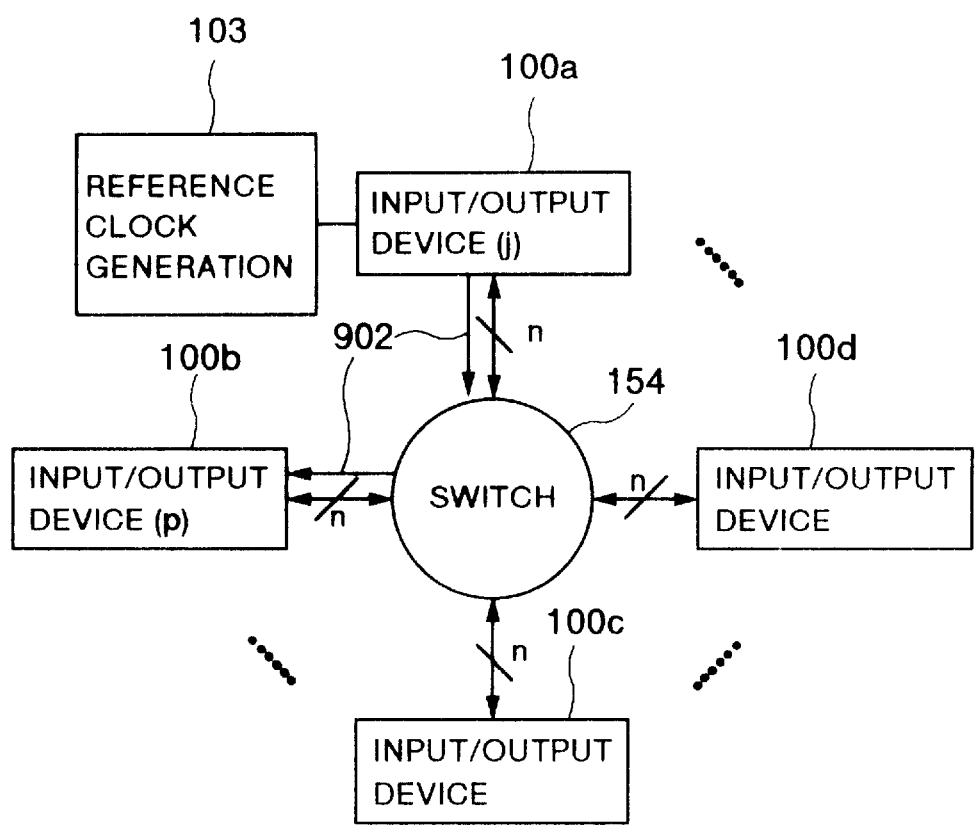
FIG. 18 is a block diagram of a star type data transmission system in accordance with a seventh embodiment of the present invention.

FIG. 18 is a data transmission system in accordance with a seventh embodiment of the present invention, wherein system is such a star type that m of input/output devices are interconnected by an inter-device connection switch 154. Data transmission between any two of the input/output devices is based on a source synchronization system. More specifically, as shown in FIG. 18, when it is desired for the input/output device (j) 100a to transmit data to the input/output device (p) 100b, the input/output device (j) 100a transmits a clock together with the data through the clock transmission line 902. In this case, relationships of j≠p, $0 \leq i \leq m-1$, and $0 \leq p \leq m-1$ are satisfied.

Like the bus type data transmission system of FIG. 2, the data transmission system of FIG. 18 can advantageously adjust the skew and realize data transmission higher than the prior art star type data transmission system according to a procedure comparable to that of the prior art. Further, the star type data transmission system can be implemented not only with the source synchronization system but also with a system using the clock distribution line 105.

The data transmission system of the bus or star type having a plurality of transmitters in accordance with the present invention can adjust the propagation delay time between the transmitter and receiver and the propagation delay skew (data skew) and clock skew (which have so far limited the transmission rate of the prior art) according to the respective transmitters to realize high-speed data transmission with a cycle shorter than the propagation delay time or clock skew. Further, the data transmission system of the source synchronization type, which is widely used in a data transmission system of a 1:1 input/output device type and which can also be employed even in a bus or star type data transmission system, can advantageously realize high speed data transmission with a cycle shorter than the data skew. Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A data transmission system having a plurality of transmitters, one or more receivers and a connection line connected between said transmitters and said receiver, wherein said transmitter includes transmission circuits for transmitting data in synchronism with a first clock, and said receiver includes reception circuits for receiving said transmitted data in synchronism with a second clock having a predetermined phase relationship with said first clock, a memory circuit for holding therein reception control information of said receiver associated with said respective transmitters, and a control circuit for controlling said reception circuits on the basis of said receiver control information, wherein said transmitter has an adjustment signal generation circuit for generating an adjustment signal, a data transmission circuit for outputting data to be transmitted, and a selector connected to said adjustment signal generation circuit and said data transmission circuit for selecting and outputting said adjustment signal and said data.

2. A data transmission system as set forth in claim 1, wherein said receiver has a latch array for adjusting a skew of said transmitted data and a data reception circuit connected to said latch array for receiving the data in synchronism with said second clock, and said control circuit controls said latch array on the basis of said receiver control information.

3. A data transmission system as set forth in claim 2, wherein said receiver has a reception phase judgement circuit for estimating an output of said latch array and for changing contents of said memory circuit on the basis of a judgement result of said reception phase judgement circuit.

4. A data transmission system as set forth in claim 3, wherein said reception phase judgement circuit includes a circuit for judging whether or not all bits of said adjustment signal can be synchronized with said second clock.

5. A data transmission system as set forth in claim 4, wherein said receiver has a data edge detection circuit for connecting an input and output of said latch array and judging whether or not said latch array can latch, said data edge detection circuit performs first condition setting of control to enable latching of bits of said adjustment signal, and said reception phase judgement circuit performs second condition setting of control to synchronize the bits of an all-data width of said adjustment signal with said second clock in same phase to change contents of said memory circuit on the basis of said first and second condition settings.

6. A data transmission system, comprising:

a plurality of transmitters;

one or more receivers; and a connection line connected between said transmitters and said receiver;

wherein said transmitter includes transmission circuits for transmitting data in synchronism with a first clock; and said receiver includes reception circuits for receiving said transmitted data in synchronism with a second clock having a predetermined phase relationship with said first clock, a memory circuit for holding therein reception control information of said receiver associated with said respective transmitters, and a control circuit for controlling said reception circuits based on said receiver controller information, wherein said transmitter has an adjustment signal generation circuit for generating an adjustment signal, a data transmission circuit for outputting data to be transmitted, and a selector connected to said adjustment signal generation circuit and said data transmission circuit for selecting and outputting said adjustment signal and said data.

7. A data transmission system as set forth in claim 6, wherein said receiver includes a latch array for adjusting a skew of said transmitted data and a data reception circuit connected to said latch array for receiving the data in synchronism with said second clock, and said control circuit controls said latch array based on said receiver control information.

8. A data transmission system as set forth in claim 7, wherein said receiver includes a reception phase judgement circuit for estimating an output of said latch array and for changing contents of said memory circuit based on a judgement result of said reception phase judgement circuit.

9. A data transmission system as set forth in claim 8, wherein said reception phase judgement circuit includes a circuit for judging whether or not all bits of said adjustment signal can be synchronized with said second clock.

10. A data transmission system as set forth in claim 7, wherein said receiver includes a data edge detection circuit for connecting an input and output of said latch array and judging whether or not said latch array can latch, said data edge detection circuit performs first condition setting of control to enable latching of bits of said adjustment signal, and said reception phase judgement circuit performs second condition setting of control to synchronize the bits of an all-data with of said adjustment signal with said second clock in the same phase to change contents of said memory circuit based on said first and second condition settings.

\* \* \* \* \*